(12) United States Patent
Baier

(10) Patent No.: US 12,151,534 B2
(45) Date of Patent: Nov. 26, 2024

(54) LINK FOR A WHEEL SUSPENSION OF A MOTOR VEHICLE AND WHEEL SUSPENSION FOR A WHEEL OF A FRONT AXLE OF A MOTOR VEHICLE

(71) Applicant: AUDI AG, Ingolstadt (DE)

(72) Inventor: Sebastian Baier, Poppenhausen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/004,216

(22) PCT Filed: Jul. 1, 2021

(86) PCT No.: PCT/EP2021/068139
§ 371 (c)(1),
(2) Date: Jan. 4, 2023

(87) PCT Pub. No.: WO2022/033762
PCT Pub. Date: Feb. 17, 2022

(65) Prior Publication Data
US 2023/0286341 A1    Sep. 14, 2023

(30) Foreign Application Priority Data

Aug. 12, 2020   (DE) .......................... 102020121159.7

(51) Int. Cl.
*B60G 7/00*         (2006.01)
*B60G 7/02*         (2006.01)

(52) U.S. Cl.
CPC .............. *B60G 7/001* (2013.01); *B60G 7/02* (2013.01); *B60G 2200/156* (2013.01);
(Continued)

(58) Field of Classification Search
CPC ........ B60G 2204/418; B60G 2206/016; B60G 7/02; B60G 7/001
See application file for complete search history.

(56) References Cited

U.S. PATENT DOCUMENTS 5,498,018 A * 3/1996 Wahl .................. B60G 3/26
280/124.138
6,705,627 B2   3/2004 Hasebe et al.
(Continued)

FOREIGN PATENT DOCUMENTS

CN      201694013 U      1/2011
DE         4337799 A1 *  5/1995 ........... B60G 21/052
(Continued)

OTHER PUBLICATIONS

Machine translation of CN_201694013_U_I obtained from FIT (Year: 2023).*
(Continued)

*Primary Examiner* — Paul N Dickson
*Assistant Examiner* — Maxwell L Meshaka
(74) *Attorney, Agent, or Firm* — Maier & Maier, PLLC

(57) ABSTRACT

A link for a wheel suspension of a motor vehicle, and a corresponding wheel suspension for a wheel of a front axle of a motor vehicle. The link includes a link base with a bearing point on the vehicle body side. The bearing point on the vehicle body side is designed in the form of a bearing eye. The bearing eye is designed as a frangible member which breaks when a specified misuse load is exceeded.

17 Claims, 7 Drawing Sheets

(52) U.S. Cl.
CPC .. *B60G 2204/143* (2013.01); *B60G 2204/418* (2013.01); *B60G 2206/016* (2013.01)

(56) References Cited

U.S. PATENT DOCUMENTS

| | | | |
|---|---|---|---|
| 10,543,726 | B2 | 1/2020 | El-Bkaily et al. |
| 11,130,380 | B2* | 9/2021 | Johnson ................ B62D 33/02 |
| 2020/0086706 | A1* | 3/2020 | Johnson ................ B62D 21/11 |
| 2020/0124085 | A1* | 4/2020 | Baier ................ F16C 11/0604 |
| 2022/0363100 | A1* | 11/2022 | Berger ................ B60G 7/005 |

FOREIGN PATENT DOCUMENTS

| | | |
|---|---|---|
| DE | 102007024741 A1 | 12/2008 |
| DE | 102013016766 A1 | 4/2015 |
| DE | 102015011707 A1 | 3/2017 |
| DE | 102016206284 A1 | 10/2017 |
| DE | 202019104056 U1 * | 9/2019 ............ B60G 7/001 |
| JP | 20071394 A | 1/2007 |
| KR | 20110054471 A * | 5/2011 |
| KR | 1020110054471 A | 5/2011 |
| KR | 101305680 B1 | 9/2013 |
| KR | 1020140072521 A | 6/2014 |
| KR | 102481873 B1 * | 12/2022 |

OTHER PUBLICATIONS

Examination Report issued on Apr. 26, 2022, in corresponding German Application No. 102020121159.7, 16 pages.
International Search Report and Written Opinion issued on Sep. 21, 2021, in corresponding International Application No. PCT/EP2021/068139, 20 pages.
International Preliminary Report on Patentability issued on Feb. 7, 2023, in corresponding International Application No. PCT/EP2021/068139, 17 pages.

* cited by examiner

LINK FOR A WHEEL SUSPENSION OF A MOTOR VEHICLE AND WHEEL SUSPENSION FOR A WHEEL OF A FRONT AXLE OF A MOTOR VEHICLE

FIELD

The invention relates to a control arm for a wheel suspension of a motor vehicle and a wheel suspension for a wheel of a front axle of a motor vehicle.

BACKGROUND

In the case of a so-called small-overlap crash, i.e., a frontal collision having a small width overlap, there is a known risk that—since the rigid side member and/or cross member structures of the vehicle body do not contribute to the absorption of the impact energy due to the small width overlap—the front wheel on the collision side will penetrate into the passenger compartment and injure vehicle occupants.

A method for controlling improved deformation behavior in a motor vehicle front end in the course of small-overlap deformation is known from DE 10 2013 016 766 A1. The method provides that a wheel, which in a non-collision situation is guided by load-bearing guide means in relation to the motor vehicle body, is influenced in its position in the event of a collision by interrupting a load transfer to the wheel by at least one load-transferring guide means and deflecting the wheel, viewed in the vehicle longitudinal and transverse directions, outward into the rear and as a result feeding it to rigid areas and in particular rocker panels.

Load-transferring guiding means, referred to hereinafter in short as control arms, are well known from the prior art. Reference is only made to JP 20071394 A as an example, from which a control arm which has a bearing eye and which is pivotably mounted on the vehicle body via a chassis bearing pressed into the bearing eye is already known.

A generic control arm of a wheel suspension of a motor vehicle is known from CN 201 694 013 U. In addition, reference is also made to the disclosure of U.S. Pat. No. 10,543,726 B2.

SUMMARY

The invention is based on the object of refining a control arm for a wheel suspension of a motor vehicle in such a way that in case of a small-overlap crash, a targeted failure of the control arm is ensured, but without affecting the function of the control arm in operation and in the event of special events and misuse events.

The control arm according to the invention, in particular a transverse control arm, comprises, in a known manner, a control arm base having a bearing point on the wheel side and a bearing point on the motor vehicle body side. The bearing point on the motor vehicle body side is designed in the form of a bearing eye into which a chassis bearing can be inserted or pressed. Via the chassis bearing insertable into the bearing eye, the control arm is fastenable or mountable in a known manner on the motor vehicle body to be pivotably movable around the bearing axis.

The bearing that can be inserted or pressed into the bearing eye is designed in particular in the form of a rubber-metal bearing, via which the control arm—in the installed state—is mountable on the motor vehicle body to be pivotably movable around the bearing axis, which is essentially aligned in the vehicle longitudinal direction.

Merely for the sake of completeness, it is also to be noted that a vehicle-fixed coordinate system is used hereinafter for direction specifications, the x axis of which extends along the longitudinal axis of the vehicle and points in the direction of travel (=forward direction of travel), the y axis of which extends along the vehicle transverse axis and—correspondingly—points to the left and the z axis is aligned upward along the vehicle vertical axis. The bearing eye is designed as a predetermined breaking part, which deliberately breaks open if a predetermined misuse load is exceeded.

The misuse load is selected so that the bearing eye only breaks open if a corresponding predetermined maximum permissible torque load is exceeded and/or a corresponding predetermined maximum traction load is exceeded, which is or are to be expected in particular only in the event of a small-overlap crash, i.e., a frontal collision with a small width overlap. That is to say, the operation of the control arm is ensured in normal driving operation and in the event of other special events and/or misuse events, such as very briskly driving over a high curb or the like.

In this way, in case of a small-overlap crash, a targeted control arm failure is ensured in a simple manner A further advantage of this embodiment, i.e., the design of the bearing eye as a predetermined breaking part, is that this can be implemented in a structurally simple manner, as a result of which cost-effective production of the control arm is ensured.

According to the invention, the control arm is distinguished in that the control arm base in the region of the bearing eye has a button-shaped stop which extends in the direction of the bearing axis and—viewed in the installed state of the control arm—is aligned extending to the rear in the x direction (=>vehicle longitudinal axis). The stop is dimensioned in its extension length and positioned in its arrangement in relation to the bearing eye in such a way that—again viewed in the installed state of the control arm—if a defined, maximum permissible pivot movement of the control arm around the vertical axis (z direction) is exceeded in the bearing point on the motor vehicle body side, the stop contacts a support surface provided on the motor vehicle body side. The maximum permissible pivot movement of the control arm around the vertical axis in the bearing point on the motor vehicle body side is selected in such a way that this is only to be expected in the event of a small-overlap crash, i.e., a frontal collision with a small width overlap, and the resulting deflection of the control arm or the bearing point on the wheel of the control arm in the x direction (=>vehicle longitudinal axis) to the rear. The effect of this embodiment is that in case of a small-overlap crash, a lever effect is generated due to the support of the stop on the provided support surface, so that the intended, targeted breaking open of the bearing eye is advantageously assisted. In order to ensure that the bearing eye is broken open in a targeted manner, the bearing eye preferably has two predetermined breaking points which are essentially opposite to one another—viewed in the radial direction r of the bearing eye.

According to a first embodiment, the predetermined breaking points are designed in the form of two notch points which—viewed in the installed state of the control arm—are introduced in the annular end face of the bearing eye at the axial end viewed in the x direction (=>vehicle longitudinal axis).

A second embodiment provides that the predetermined breaking points are designed in the form of two locally limited material removals of the bearing eye lateral surface—viewed in the circumferential direction of the bearing eye.

The advantage of designing the predetermined breaking points in the form of notch points or material removals is that they are producible quickly and cost-effectively by means of machining manufacturing methods and/or forming manufacturing methods.

The invention is also based on the object of refining a wheel suspension for a wheel of a front axle of a motor vehicle in such a way that in case of a small-overlap crash, a simplified separation of the support control arm is ensured and, as a result, a wheel is prevented from penetrating into the passenger compartment.

In a known manner, in the wheel suspension for a wheel on a front axle of a motor vehicle, the wheel is articulated or guided via a control arm assembly on the motor vehicle body side. In addition, the wheel suspension is designed in such a way that in case of a small-overlap crash, i.e., a frontal collision with an obstacle with a small width overlap, the load transfer from a control arm of the control arm assembly to the accident-side wheel is interrupted and the wheel is deflected outward to the rear in the vehicle longitudinal and transverse directions (x and y directions).

The wheel suspension according to the invention has proven to be particularly advantageous because—in contrast to the prior art according to DE 10 2013 016 766 A1—no additional destruction device is required to interrupt the load transfer of a control arm, so that in comparison to the prior art according to DE 10 2013 016 766 A1, a wheel suspension is provided which saves installation space, has fewer components, is significantly structurally simplified, and is thus particularly cost-effective.

The control arm is preferably designed as a wishbone. The arrangement of the control arm is arbitrary and depends on the package, i.e., the wishbone can be arranged as a support control arm together with a trailing control arm in the lower control arm level. However, it is also conceivable to arrange the wishbone with at least one further trailing control arm in the upper control arm plane. In order to ensure a structurally simple and cost-effective design of the mounting on the motor vehicle body side of the control arm, the control arm is preferably mounted via a rubber-metal bearing pressed into the bearing eye so it is pivotably movable around the bearing axis aligned essentially in the x direction (=>vehicle longitudinal axis). Another effect of the rubber-metal bearing is that in case of a small-overlap crash and the resulting deflection of the control arm to the rear in the x-direction, i.e., against the direction of travel, the cardanic entanglement occurring in the rubber-metal bearing generates a high torque M in the bearing point on the motor vehicle body side around the vertical axis, so that the combination of torque M and the tensile force acting on the control arm ensures that the bearing eye or the predetermined breaking points of the bearing eye tear open as intended.

A further preferred embodiment of the wheel suspension according to the invention provides that the chassis bearing on the motor vehicle body side of the control arm is mounted between two bearing legs of a bearing bracket, which are essentially aligned in the y direction, i.e., the vehicle transverse direction, and that on the rear bearing leg, viewed in the x direction, a support surface is formed for the stop on the control arm base. The support surface formed on the rear bearing leg and the stop formed on the control arm base are positioned in relation to one another and dimensioned such that after a defined, maximum permissible pivoting movement of the control arm in the bearing bracket on the motor vehicle body side around the vehicle vertical direction (z direction) has been exceeded, the stop contacts the support surface formed on the rear bearing leg. By contacting the stop with the support surface, a lever effect is advantageously generated, with the result that the intended, targeted breaking open of the bearing eye is assisted.

The control arm assembly of the wheel suspension is preferably mounted on the motor vehicle body side via an auxiliary frame.

BRIEF DESCRIPTION OF THE FIGURES

Further advantages and possible uses of the present invention will be apparent from the following description in conjunction with the exemplary embodiment depicted in the drawing.

In the figures.

In the following description and in the figures, to avoid repetition, the same parts and components are identified by the same reference numerals, provided that no further differentiation is necessary or useful.

DETAILED DESCRIPTION

Figure 1:
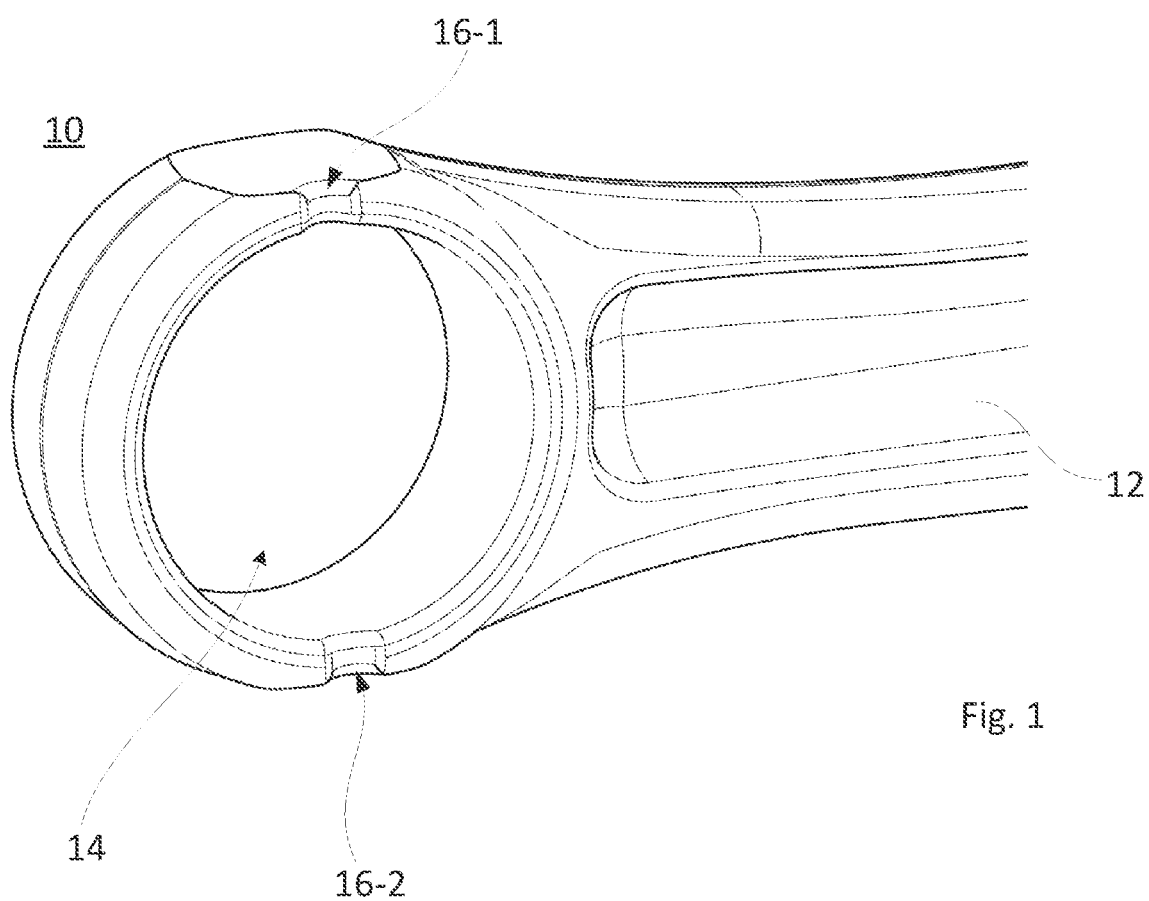
FIG. 1 shows a first embodiment of a control arm according to the invention.

FIG. 1 shows a control arm for a wheel suspension of a motor vehicle identified as a whole by the reference numeral 10. The control arm 10 comprises a control arm base 12 and a bearing eye formed at one end of the control arm base 12 and identified as a whole by the reference numeral 14 for receiving a chassis bearing—not shown here. As FIG. 1 also shows, the bearing eye 14 has two predetermined breaking points 16-1, 16-2 arranged radially opposite to one another, which in the present case are in the form of two notch points.

Figure 2:
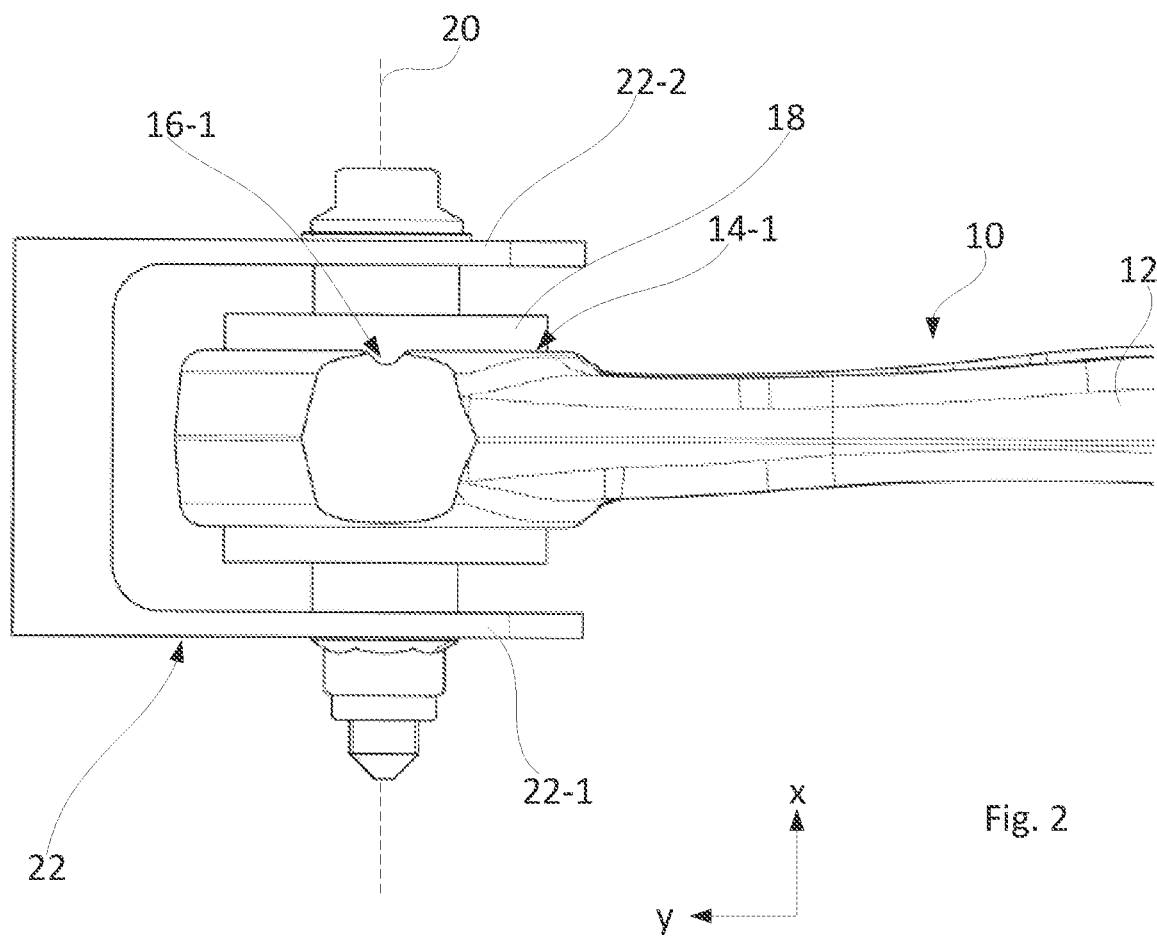
FIG. 2 shows the control arm from FIG. 1 in the installed state in a wheel suspension.

In the installed state, cf. FIG. 2, the control arm 10 is mounted between two bearing legs 22-1, 22-2 of a bearing bracket 22 arranged on the motor vehicle body side via a rubber-metal bearing 18 pressed into the bearing eye 14 so that it is pivotably movable around a bearing axis 20 aligned essentially in the x direction. As can also be seen in FIG. 2, the two notch points are introduced into the annular end face 14-1 of the bearing eye which is in front view in the x direction (=direction of travel). The notch points are dimensioned such that when a predetermined misuse load is exceeded, the bearing eye 14 breaks open in a targeted manner in order to enable the control arm 10 to separate.

The misuse load is selected so that the bearing eye 14 only breaks open if a corresponding predetermined maximum permissible torque load is exceeded and/or a corresponding predetermined maximum traction load is exceeded, which is or are to be expected in particular only in the event of a small-overlap crash, i.e., a frontal collision with a small width overlap. That is to say, the operation of the control arm 10 is ensured in normal driving operation and in the event of other special events and/or misuse events, such as very briskly driving over a high curb or the like.

Figure 3:
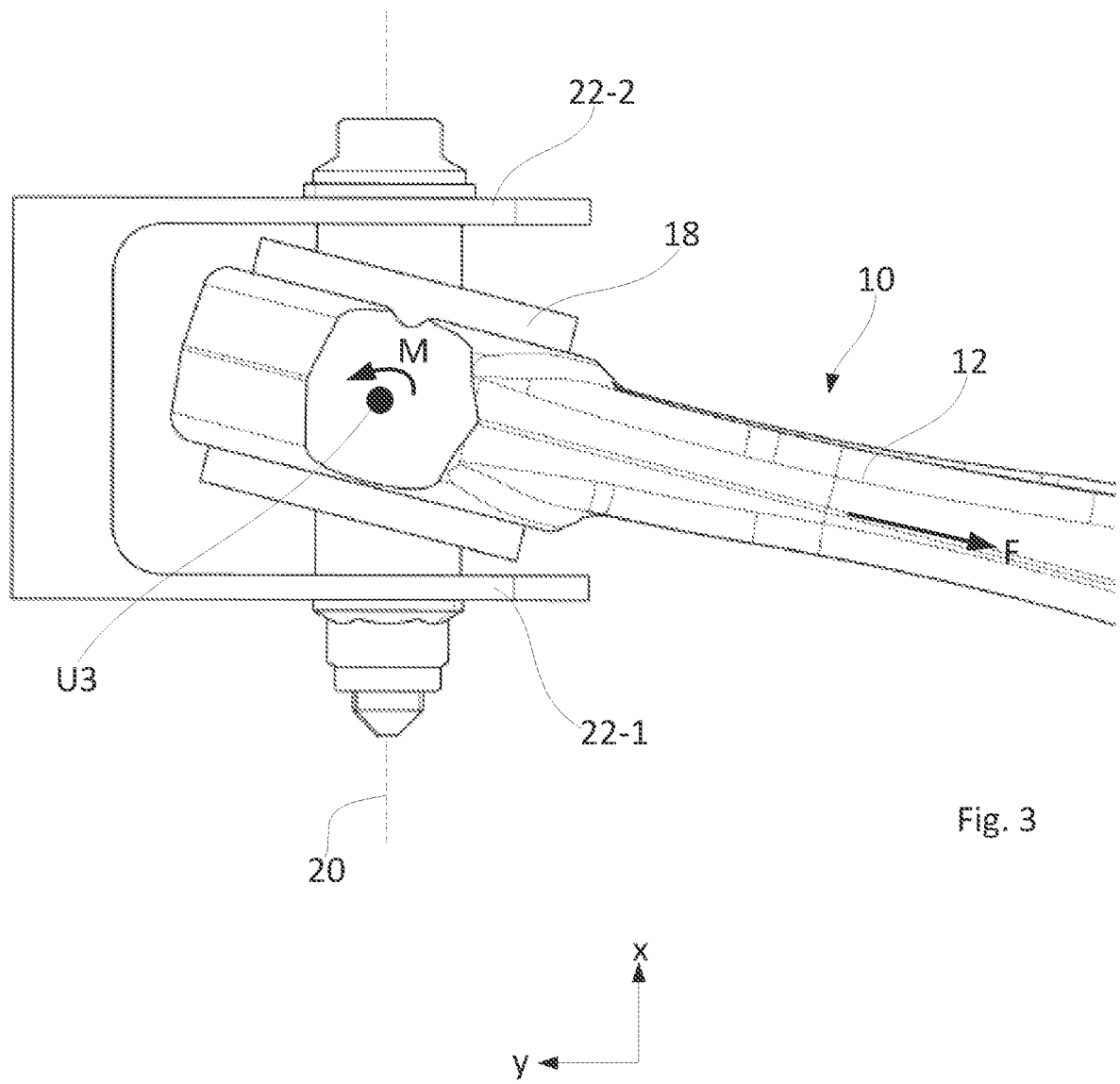
FIG. 3 shows the wheel suspension from FIG. 2 in a small-overlap crash situation.

In a small-overlap crash situation, as shown in FIG. 3, the control arm 10 is deflected to the rear in the x direction (counter to the direction of travel) around the bearing point—identified here as the U3 point. Due to the deflection of the control arm 10 to the rear, a cardanic entanglement occurs in the rubber-metal bearing 18, as a result of which a high restoring torque M is generated at the U3 point around the z axis. The combination of torque M and traction force F acting on control arm 10 is sufficient to trigger a targeted failure of the bearing eye 14, i.e., the bearing eye 14 first breaks open at the predetermined breaking points 16-1 and 16-2 formed as Notch points, then tears open completely and releases the control arm 10, so that the earliest possible separation of the control arm 10 is ensured.

Figure 4:
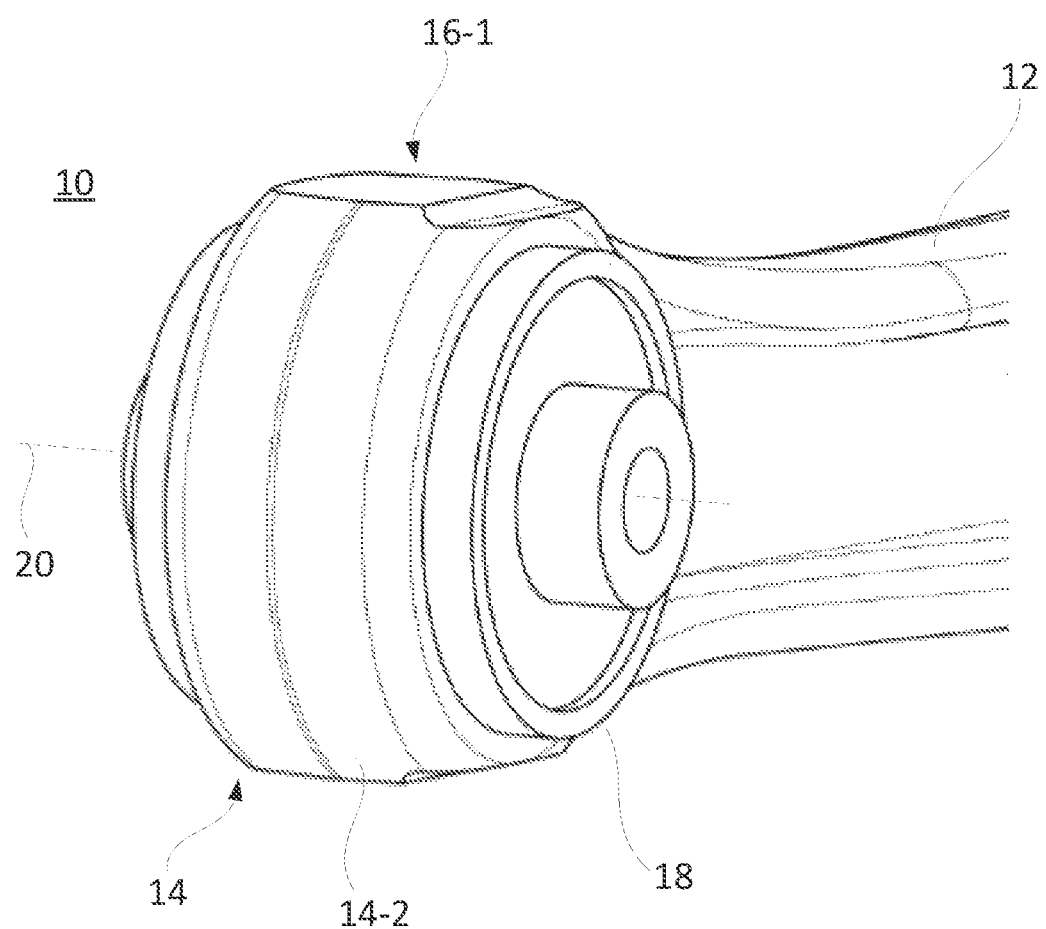
FIG. 4 shows the control arm according to the invention in a second embodiment.
Figure 5:
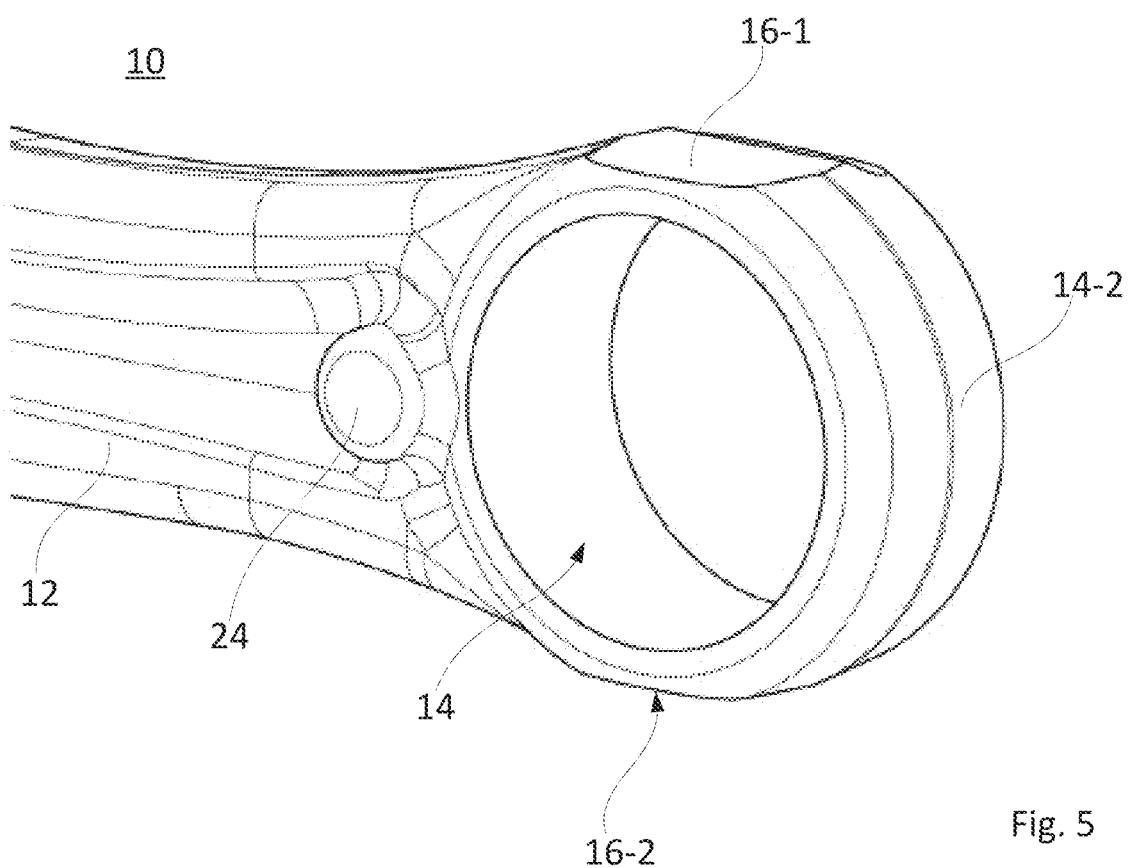
FIG. 5 shows a further embodiment of the control arm from FIG. 4.
Figure 6:
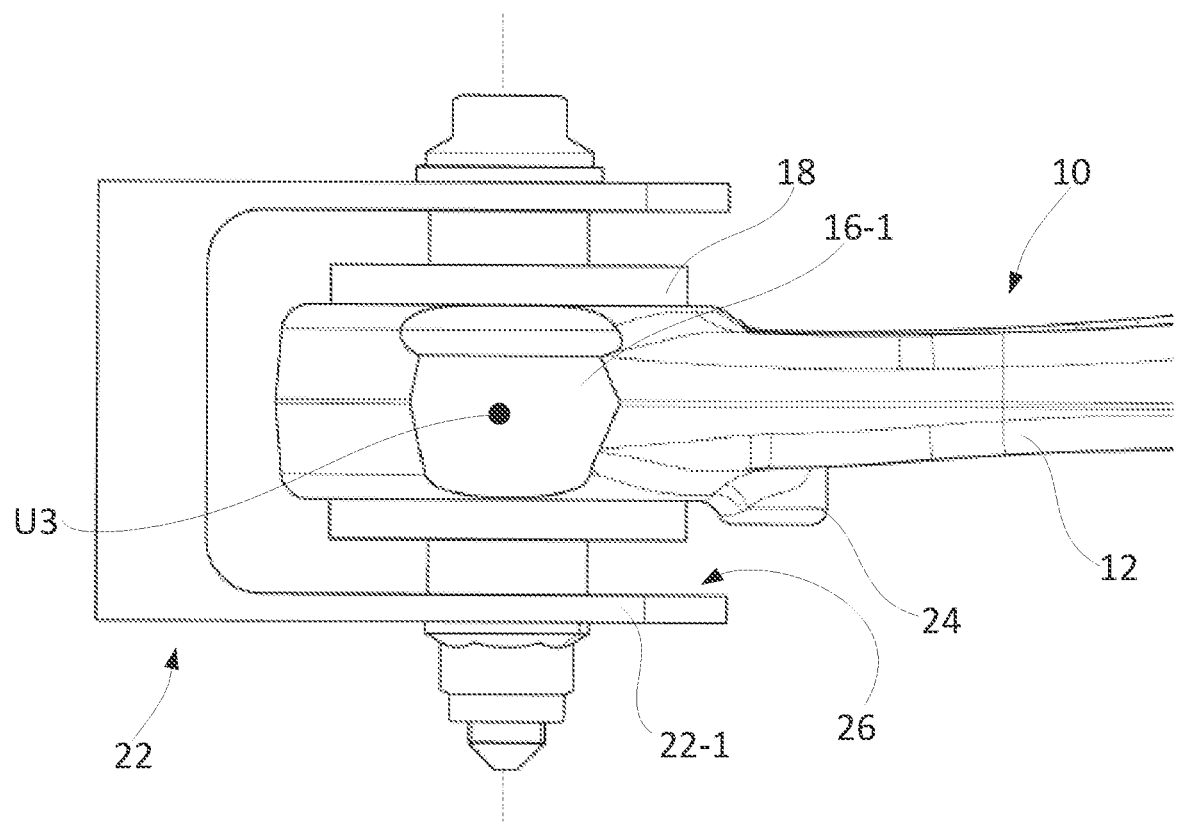
FIG. 6 shows the control arm from FIG. 4 in the installed state in a wheel suspension.

The embodiment of the control arm 10 shown in FIG. 4 essentially corresponds to the embodiment shown in FIG. 1; According to the embodiment shown in FIG. 4, only the two radially opposite predetermined breaking points are formed—viewed in the circumferential direction of the bearing eye 14—as locally limited material removals in the outer lateral surface 14-2 of the bearing eye 14. The behavior in a small-overlap crash situation corresponds to that described for FIG. 3. According to the embodiment shown in FIG. 5, a stop 24 is formed on the control bar base 12 in the area of the bearing eye 14. As can be seen from FIG. 6, the stop 24 is arranged on the control bar base 12 in such a way that in the installed state of the control bar 10, the stop 24 is oriented extending to the rear in the x direction (=direction of travel). In addition—as can also be seen in FIG. 6—a support surface 26 is formed on the opposite bearing bracket 22-1, i.e., the rear bearing bracket 22-1 in the x direction (direction of travel).

Figure 7:
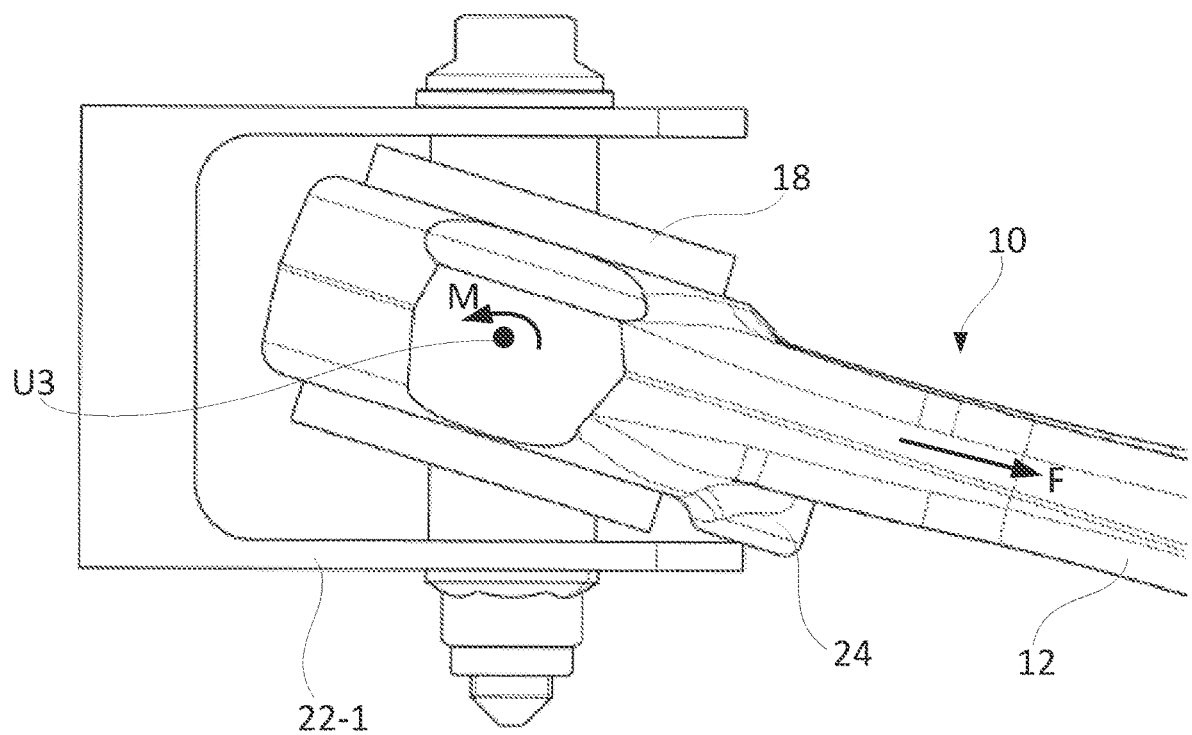
FIG. 7 shows the control arm from FIG. 4 in a small-overlap crash situation.
Figure 7:
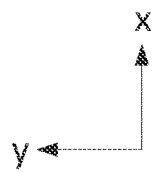

The stop 24 and the support surface 26 are positioned and dimensioned such that in a small-overlap crash situation, cf. FIG. 7, after a defined, maximum permissible pivoting movement of the control arm 10 around the U3 point has been exceeded, the stop 24 comes into contact on the support surface 26. This generates an additional lever effect, which advantageously assists the targeted breaking open of the bearing eye 14 as described under FIG. 3

The invention claimed is:

1. A control arm of a wheel suspension of a motor vehicle, comprising a control arm base having a bearing point on the motor vehicle body side, wherein the bearing point on the motor vehicle body side is designed in the form of a bearing eye, wherein the bearing eye is designed as a predetermined breaking part that breaks open when a predetermined misuse load is exceeded, wherein the control arm base has a stop, which extends in the direction of the bearing axis in the area of the bearing eye and which, when viewed in the installed state of the control arm, is oriented extending to the rear in the vehicle longitudinal direction, wherein the extending of the stop terminates in a free end, wherein the stop is dimensioned and positioned such that, when viewed in the installed state of the control arm, when a defined, maximum permissible pivoting movement of the control arm in the bearing point on the motor vehicle body side around the vehicle vertical direction is exceeded, the free end of the stop contacts a support surface provided on the motor vehicle body side.

2. The control arm according to claim 1, wherein the bearing eye is designed having two predetermined breaking points arranged radially opposite to one another.

3. The control arm according to claim 2, wherein the predetermined breaking points are designed in the form of two notch points which are introduced into one of the two annular end faces of the bearing eye, wherein the notch points are introduced into the end face oriented forward, when viewed in the installed state of the control arm, in the vehicle longitudinal direction.

4. The control arm according to claim 2, wherein the predetermined breaking points are in the form of two, when viewed in the circumferential direction of the bearing eye, locally delimited material removals of the outer lateral surface of the bearing eye.

5. A wheel suspension for a wheel of a front axle of a motor vehicle, in which the wheel is articulated and guided via a control arm assembly on the motor vehicle body and which is designed such that in case of a frontal collision with an obstacle with a small width overlap, a load transfer from a control arm of the control arm assembly to the wheel is interrupted and the wheel is deflected outwards to the rear, viewed in the longitudinal and transverse directions of the vehicle, wherein the control arm is designed according to claim 1.

6. The wheel suspension according to claim 5, wherein the control arm is designed as a wishbone and is arranged together with a trailing control arm in a lower or upper control arm plane.

7. The wheel suspension according to claim 5, wherein the control arm is mounted on the motor vehicle body side pivotably movable around the bearing axis oriented in the vehicle longitudinal direction via a rubber-metal bearing.

8. The wheel suspension according to claim 5, wherein a bearing of the control arm on the motor vehicle body side is mounted between two bearing legs of a bearing bracket oriented in the vehicle transverse direction, wherein a rear bearing leg of the two bearing legs, as viewed in the vehicle longitudinal direction, has a support surface for the stop formed on the control arm base, wherein the stop and the support surface are positioned and dimensioned such that if a defined maximum permissible pivoting movement of the control arm in the bearing bracket on the motor vehicle body side around the vehicle vertical direction is exceeded, the stop contacts the support surface formed on the rear bearing leg.

9. The wheel suspension according to claim 6, wherein the control arm assembly is mounted on the vehicle body via an auxiliary frame.

10. The wheel suspension according to claim 6, wherein the control arm is mounted on the motor vehicle body side pivotably movable around the bearing axis oriented in the vehicle longitudinal direction via a rubber-metal bearing.

11. The wheel suspension according to claim 6, wherein a bearing of the control arm on the motor vehicle body side is mounted between two bearing legs of a bearing bracket oriented in the vehicle transverse direction, wherein a rear bearing leg of the two bearing legs, as viewed in the vehicle longitudinal direction, has a support surface for the stop formed on the control arm base, wherein the stop and the support surface are positioned and dimensioned such that if a defined maximum permissible pivoting movement of the control arm in the bearing bracket on the motor vehicle body side around the vehicle vertical direction is exceeded, the stop contacts the support surface formed on the rear bearing leg.

12. The wheel suspension according to claim 7, wherein a bearing of the control arm on the motor vehicle body side is mounted between two bearing legs of a bearing bracket oriented in the vehicle transverse direction, wherein a rear bearing leg of the two bearing legs, as viewed in the vehicle longitudinal direction, has a support surface for the stop formed on the control arm base, wherein the stop and the support surface are positioned and dimensioned such that if a defined maximum permissible pivoting movement of the control arm in the bearing bracket on the motor vehicle body side around the vehicle vertical direction is exceeded, the stop contacts the support surface formed on the rear bearing leg.

13. The wheel suspension according to claim 7, wherein the control arm assembly is mounted on the vehicle body via an auxiliary frame.

14. The wheel suspension according to claim 8, wherein the control arm assembly is mounted on the vehicle body via an auxiliary frame.

15. The control arm according to claim 1, wherein the free end of the stop contacts a support surface provided on a bearing leg of a bearing bracket corresponding to the bearing point on the motor vehicle body side.

16. A wheel suspension for a wheel of a front axle of a motor vehicle, in which the wheel is articulated and guided via a control arm assembly on the motor vehicle body and which is designed such that in case of a frontal collision with an obstacle with a small width overlap, a load transfer from a control arm of the control arm assembly to the wheel is interrupted and the wheel is deflected outwards to the rear, viewed in the longitudinal and transverse directions of the vehicle, wherein the control arm comprises a control arm base having a bearing point on the motor vehicle body side, wherein the bearing point on the motor vehicle body side is designed in the form of a bearing eye, wherein the bearing eye is designed as a predetermined breaking part that breaks open when a predetermined misuse load is exceeded, wherein the control arm base has a stop, which extends in the direction of the bearing axis in the area of the bearing eye and which, when viewed in the installed state of the control arm, is oriented extending to the rear in the vehicle longitudinal direction, wherein the stop is dimensioned and positioned such that, when viewed in the installed state of the control arm, when a defined, maximum permissible pivoting movement of the control arm in a bearing point on the motor vehicle body side around the vehicle vertical direction is exceeded, the stop contacts a support surface provided on the motor vehicle body, wherein a bearing of the control arm on the motor vehicle body side is mounted between two bearing legs of a bearing bracket oriented in the vehicle transverse direction, wherein a rear bearing leg of the two bearing legs, as viewed in the vehicle longitudinal direction, has a support surface for the stop formed on the control arm base, wherein the stop and the support surface are positioned and dimensioned such that if a defined maximum permissible pivoting movement of the control arm in the bearing bracket on the motor vehicle body side around the vehicle vertical direction is exceeded, the stop contacts the support surface formed on the rear bearing leg.

17. The wheel suspension according to claim 16, wherein the control arm assembly is mounted on the vehicle body via an auxiliary frame.

* * * * *